United States Patent
Milam et al.

(10) Patent No.: US 11,588,901 B2
(45) Date of Patent: Feb. 21, 2023

(54) DETECTION RESULTS COMMUNICATION SYSTEMS AND METHODS

(71) Applicant: Teledyne FLIR Detection, Inc., Stillwater, OK (US)

(72) Inventors: William T. Milam, Maryville, TN (US); Hartmut Brands, Oak Ridge, TN (US); Kyle Hawes, Knoxville, TN (US); Christopher P. Boyd, Oak Ridge, TN (US)

(73) Assignee: Teledyne FLIR Detection, Inc., Stillwater, OK (US)

( * ) Notice: Subject to any disclaimer, the term of this patent is extended or adjusted under 35 U.S.C. 154(b) by 586 days.

(21) Appl. No.: 16/181,055

(22) Filed: Nov. 5, 2018

(65) Prior Publication Data
US 2019/0162564 A1   May 30, 2019

Related U.S. Application Data

(60) Provisional application No. 62/593,133, filed on Nov. 30, 2017.

(51) Int. Cl.
*G06K 19/06* (2006.01)
*H04L 67/30* (2022.01)
(Continued)

(52) U.S. Cl.
CPC .............. *H04L 67/30* (2013.01); *G01D 7/00* (2013.01); *G01D 9/005* (2013.01); *G06K 7/1417* (2013.01);
(Continued)

(58) Field of Classification Search
CPC ........ G01D 7/00; G01D 9/005; G06K 7/1417; G06K 19/06037; H04L 67/12; H04L 67/30
(Continued)

(56) References Cited

U.S. PATENT DOCUMENTS

| | | | |
|---|---|---|---|
| 8,881,990 B2 | 11/2014 | Hunt et al. | |
| 8,997,241 B2 | 3/2015 | Terwilliger et al. | |
| 9,027,837 B2 | 5/2015 | Hwang | |
| 9,699,299 B1 | 7/2017 | Pereira et al. | |

(Continued)

FOREIGN PATENT DOCUMENTS

| | | |
|---|---|---|
| CN | 102622630 | 8/2012 |
| WO | WO 2012/141455 | 10/2012 |

OTHER PUBLICATIONS

"15 Cool QR Code Things [article]," Spider Trainers, [retrieved on Dec. 17, 2018], 6 Pages [online]. Retrieved from the Internet: <https://www.spidertrainers.com/resources-2/15-cool-qr-code-things-article/>.

(Continued)

*Primary Examiner* — Daniel A Hess
(74) *Attorney, Agent, or Firm* — Haynes and Boone, LLP (57) ABSTRACT

Various techniques are disclosed for encoding and communicating detection results. In one example, a device includes a detector configured to capture measurement data in response to an external source. The device further includes one or more processors. The detection device further includes one or more memories including instructions stored therein, which when executed by the one or more processors, cause the one or more processors to perform operations. The operations include analyzing the measurement data to generate detection results. The operations further include generating a quick response (QR) code encoding at least a portion the detection results. The operations further include providing the QR code for access by an external device. Additional devices and related methods are also provided.

20 Claims, 5 Drawing Sheets

(51) Int. Cl.
*G01D 7/00* (2006.01)
*G01D 9/00* (2006.01)
*H04L 67/12* (2022.01)
*G06K 7/14* (2006.01)

(52) U.S. Cl.
CPC ........ G06K 19/06037 (2013.01); H04L 67/12 (2013.01)

(58) Field of Classification Search
USPC ........................................................ 702/122
See application file for complete search history.

(56) References Cited

U.S. PATENT DOCUMENTS

| | | | |
|---|---|---|---|
| 2007/0205370 A1* | 9/2007 | Murdoch | G01T 1/17 250/369 |
| 2013/0032634 A1* | 2/2013 | McKirdy | G06K 7/1413 235/375 |
| 2014/0166739 A1 | 6/2014 | Savage | |
| 2015/0271098 A1 | 9/2015 | Somadder et al. | |
| 2017/0176255 A1* | 6/2017 | Nciri | G01J 3/0224 |
| 2018/0113025 A1* | 4/2018 | Morales Rodriguez | G01N 21/25 |
| 2018/0188171 A1* | 7/2018 | Afzali-Ardakani | G01N 21/554 |
| 2018/0314763 A1* | 11/2018 | Corghi | G01B 11/275 |

OTHER PUBLICATIONS

"Digiwaste Platform: The World's First Fully Digital Platform for Nuclear Waste Management," CAEN Sys, [retrieved on Oct. 4, 2018], 11 Pages [online]. Retrieved from the Internet: <https://www.caensys.com/areas/digiwaste>.

"IMI ONYX Personal Radiation Monitor Operation Manual," International Medcom, Inc., [retrieved on Dec. 17, 2018], 38 Pages [online]. Retrieved from the Internet: <https://medcom.com/product/onyx-radiation-detector/>.

"Micro-Detective-HX," ORTEC®, [retrieved on Jun. 16, 2017], 12 Pages [online]. Retrieved from the Internet: <http://www.ortec-online.com/products/nuclear-security-and-safeguards/hand-held-radioisotope-indentifiers-riids/micro-detective-hx>.

"RIIDEye X/M Series Handheld Radiation Isotope Identifiers," Thermo Scientific, [retrieved on Dec. 14, 2018], 3 Pages [online]. Retrieved from the Internet: <https://www.thermofisher.com/order/catalog/product/4250863>.

Shakil et al., "Quick Response Code in Oral and Maxillofacial Radiology," Journal of Oral and Maxillofacial Radiology, Sep.-Dec. 2014, pp. 95-96, vol. 2, Issue 3.

"SPIR-ACE Radionuclide Identification Device (RID)," Mirion Technologies (MGPI), Inc., [retrieved on Dec. 14, 2018], 6 Pages [online]. Retrieved from the Internet: <https://www.mirion.com/products/radiation-isotope-identification-device-RIID/>.

* cited by examiner

DETECTION RESULTS COMMUNICATION SYSTEMS AND METHODS

CROSS REFERENCE TO RELATED APPLICATIONS

This application claims the benefit of and priority to U.S. Provisional Patent Application No. 62/593,133 filed Nov. 30, 2017 and entitled "DETECTION RESULTS COMMUNICATION SYSTEMS AND METHODS," which is incorporated herein by reference in its entirety.

TECHNICAL FIELD

The present disclosure relates to detection devices and, more particularly, to systems and methods for generating and distributing detection results associated with such devices.

BACKGROUND

Detection of explosives, narcotics, radiation, and other matter and/or energy sources of interest is an area of ongoing global concern for security and other purposes. Distribution of information pertaining to such detection may facilitate verification of such detection (e.g., to avoid false positives or false negatives) and mitigation of detected matter and/or energy sources of interest.

However, many conventional detection devices are limited to merely taking and displaying data measurements with little to no analysis. For example, such devices may provide raw measurement data without any additional information that may be useful for operators to understand or interpret the measurement data.

Moreover, conventional detection devices may provide only limited options for distributing data measurements or other information in a convenient manner. In this regard, many such devices may only support conventional text output or other cumbersome formats that are difficult to rapidly access and analyze, such as by devices (e.g., handheld portable devices) with small displays, small keyboards, and/or other small input/output components. Furthermore, conventional detection devices may provide such data using file formats that are not necessarily decodable or compatible with other hardware or software used by their intended recipients.

SUMMARY

In accordance with various embodiments further discussed herein, systems and methods are provided for communication of detection results. To facilitate such communication, a detection device may generate a quick response (QR) code representation of at least a portion of the detection results and provide the QR code representation for access by one or more recipient devices. The QR code representation may include one or more QR codes. The QR code representation may be distributed by displaying the QR code(s) (e.g., on a display of the detection device or another device) to allow optical scanning of the QR code(s), uploading the QR code(s) onto a network to allow access by other devices, and/or other distribution mechanisms.

Techniques described herein may be applied to different types of detection devices, such as analyte detection devices, radiation detection devices, infrared (IR) detection devices, thermal radiation devices, and/or other types of detection devices. By way of non-limiting examples, the detection devices may be operated to facilitate detection and identification of explosives, narcotics, biological materials, biological and/or chemical warfare agents, toxic industrial chemicals (TICs), illicit substances, radiation and/or related radiation particles, human intruders, and/or other matter and/or energy present in an external source (e.g., any source of stimulation for the detection devices).

In one or more embodiments, a method includes capturing measurement data at a detector of a device in response to an external source. The method further includes analyzing, by a processor of the portable detection device, the measurement data to generate detection results. The method further includes generating, by the processor, a QR code encoding at least a portion of the detection results. The method further includes providing the QR code for access by an external device.

In one or more embodiments, a device includes a detector configured to capture measurement data in response to an external source. The device further includes one or more processors. The device further includes one or more memories including instructions stored therein, which when executed by the one or more processors, cause the one or more processors to perform operations. The operations include analyzing the measurement data to generate detection results. The operations further include generating a QR code encoding at least a portion of the detection results. The operations further include providing the QR code for access by an external device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Various techniques are provided to facilitate communication of detection results. In some embodiments, such a detection device may be operated to capture measurement data in response to an external source, analyze the measurement data to generate detection results, and facilitate communication (e.g., distribution) of such detection results. The detection results may be based on measurement data captured in response to external sources, such as electromagnetic radiation, biological material, and/or chemical material. The detection results may be associated with the presence (or lack of presence) of explosives, narcotics, bacteria, biological and/or chemical warfare agents, TICs, illicit substances, radiation and/or related radiation particles (e.g., alpha particles), human intruders, and/or other matter and/or energy of interest.

In some embodiments, the measurement data may be captured by sampling ambient air, surfaces (e.g., table surfaces, luggage surfaces), and/or a scene. In some cases, the external source may be sampled directly by the detection device. For example, the external source may include an infrared radiation source that can be received by an opening of the detection device for analysis by the detection device. In other cases, the external source may be externally sampled and a sample associated with the external source provided internally to the detection device for analysis by the detection device. For example, the external source may be a surface from which a sample may be collected (e.g., using a sampling swab) and the sample analyzed to determine whether or not one or more biological and/or chemical substances of interest are present on the surface.

In facilitating the communication of such detection results, the detection device may generate a QR code representation of at least a portion of the detection results and provide the QR code representation for access by one or more recipient devices. The QR code representation may include one or more QR codes. In this regard, the detection results (or portion thereof) may be encoded in one or more QR codes. For example, in some embodiments, the number of QR codes utilized may be based on a size (e.g., number of bits) of the detection results (or portion thereof) to be communicated (e.g., distributed) and an amount of data encodable into each QR code.

In some embodiments, at least a portion of the measurement data and/or other associated data (e.g., metadata) may be communicated together with the detection results, such as encoded in the QR code representation. The metadata may include information indicative of a location and/or a time at which the measurement data was captured by the detection device, weather conditions when the measurement data was captured, a user who operated the detection device to capture the measurement data, and/or generally any data associated with the measurement data and/or detection results. The type of metadata information to be distributed with the detection results may be predetermined and/or selectable by a user. Accordingly, in such embodiments, the detection device may determine a size (e.g., number of bits) of the detection results, measurement data, and/or metadata to be communicated, and generate a QR code representation with an appropriate number of QR codes.

After the QR code representation is generated, the detection device may provide (e.g., distribute) the QR code representation to intended recipients (e.g., user devices, servers), such as through social media networks, public networks, private networks, or generally any networks readily accessible to intended recipients of the detection results. In some cases, the detection device may provide the QR code representation in a non-networked manner. For example, the detection device may cause a display of the detection device to display the QR code(s), allowing other devices (e.g., intended recipients in proximity to the detection device) to optically scan the displayed QR code(s). As another example, the detection device may provide the QR code(s) via a connection, such as a Universal Serial Bus (USB) connection, between the detection device and another device. In some embodiments, the detection device may securely provide the QR code representation, such as through encryption schemes and/or privacy settings (e.g., for a social media network and/or reach back network). For example, the detection device may encrypt the detection results (or portion thereof) and encode the encrypted data in the QR code(s).

The detection device may then analyze the captured measurement data to generate the detection results. In some embodiments, the detection device may generate the detection results in the form of a detection report. The detection report may include source identification information for facilitating identification of matter and/or energy of interest present in the external source. In some cases, the source identification information may indicate that one or more substances of interest (e.g., a biological and/or chemical warfare agent) are determined to be present (or determined to not be present) in the external source. For example, the source identification information may identify (e.g., by name) one or more substances of interest determined to be present in the external source, and possibly an accuracy level associated with the detection device's identification. Alternatively or in addition, the source identification information may facilitate determination of whether one or more substances of interest are determined to be present in the external source. For example, in a radiation detection device, the source identification information may include statistical information (e.g., averages, minimums, maximums, etc.) and/or a radiation profile (e.g., in the form of a histogram) associated with the external source to facilitate identification of any substance(s) of interest (e.g., radioisotopes) in the external source.

The generation of the QR code representation of the detection results generally facilitates distribution of the detection results in the form of QR codes. Available reach back networks and/or social media networks that readily receive image-oriented content such as QR codes may help streamline the distribution of the QR codes. The detection results encoded in the QR codes may be, or may be derived into, user-actionable information from which the intended recipients may determine appropriate actions to perform. For example, the QR codes may include source identification information indicating that a harmful substance has been detected at a particular location at a particular time.

The QR codes may be received (e.g., accessed, scanned, downloaded for scanning) by recipient devices. After receiving and decoding the QR codes, recipients of the QR codes may analyze the detection results contained in the QR codes, determine actions based on the detected results, and perform the actions. When a QR code contains encrypted data, the recipients may use appropriate decryption material (e.g., decryption key) to decrypt the encrypted data. In some embodiments, actions may include verifying the detection results and, when appropriate, mitigating the presence of detected matter and/or energy. For example, when the detection results indicate that a harmful substance was detected at a certain location at a certain time, the recipients may be, or may contact, first responders to perform appropriate actions to verify and mitigate the presence of the harmful substance.

Thus, various embodiments provided herein can be used for facilitating communication of detection results for detection devices. In this regard, generation of a QR code representation of the detection results may allow the detection results to be more readily distributed to intended recipients, since QR codes generally take up small real estate on a screen, paper, packing, and/or other material onto which QR codes may be printed or displayed. In some cases, such distribution may be to and/or by way of a reach back network or a social media network, which may provide dynamic platforms suited for uploading, downloading, or otherwise communicating QR codes between different devices and/or network servers.

The techniques described herein may be applied to different types of detection devices, such as analyte detection devices, radiation detection devices, and/or other types of detection devices. An analyte detection device may include a chemical detection device and/or a biological detection device. A radiation detection device may include an ionizing detection device, an infrared detection device, or generally any detection device for capturing and analyzing a portion of the electromagnetic radiation spectrum. In some embodiments, the detection devices may be implemented as handheld portable detection devices. In some cases, a detection device may include multiple types of detectors that can be operated either one at a time or simultaneously.

Figure 1:
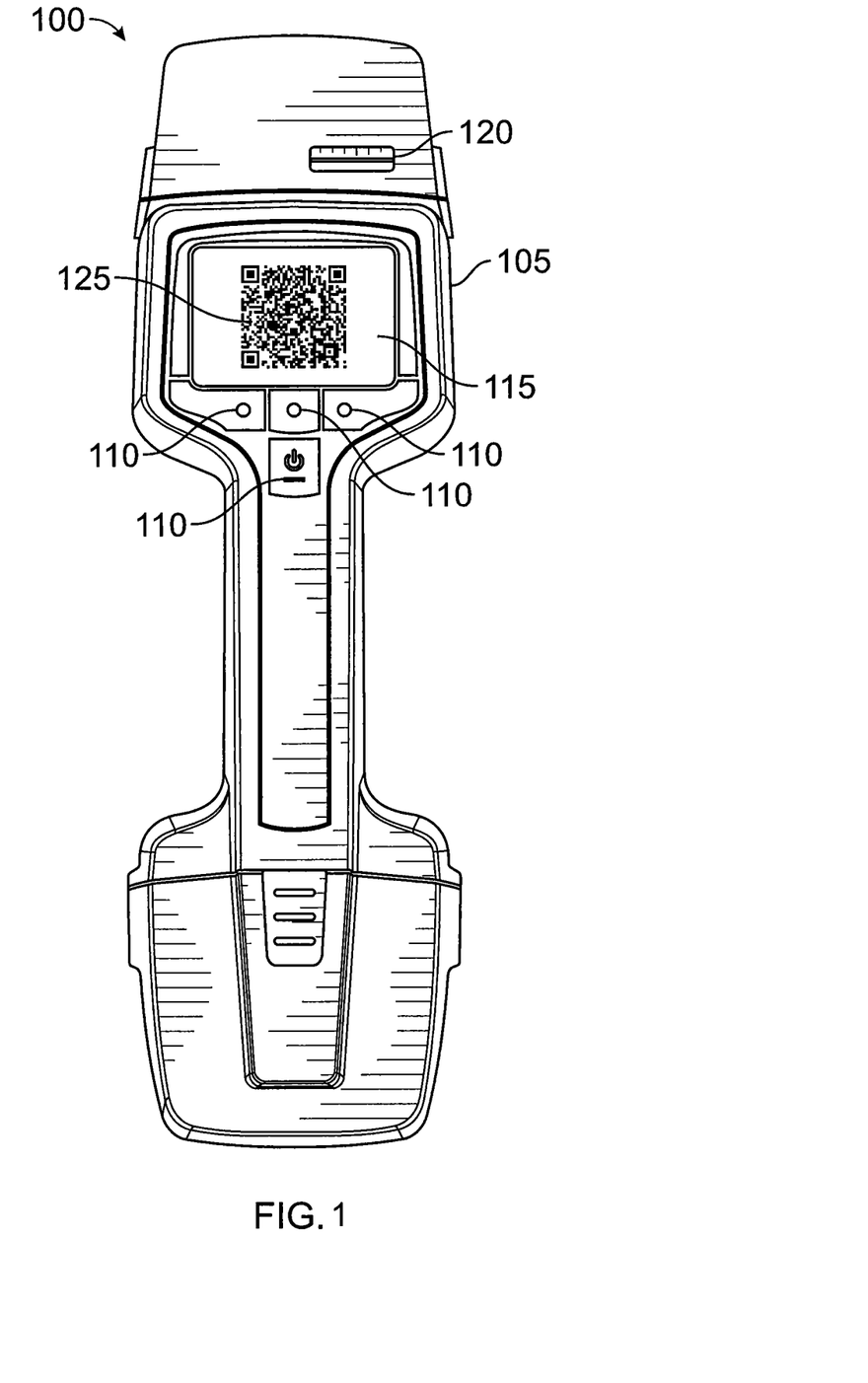
FIG. 1 illustrates a detection device in accordance with an embodiment of the disclosure.

Turning now to the drawings, FIG. 1 illustrates a detection device 100 in accordance with an embodiment of the disclosure. In some cases, the detection device 100 may be implemented as a handheld portable detection device. In FIG. 1, the detection device 100 is implemented as an analyte detection device for detecting biological and/or chemical material. However, other types of detection devices including ionizing radiation detection devices, IR radiation detection devices, and/or thermal radiation detection devices may be used. Accordingly, in various embodiments, various types of sources (e.g., matter and/or energy) may be detected depending on the type of detection device that is implemented.

The detection device 100 includes a housing 105, user controls 110, a display 115, and a slot 120. The housing 105 may enclose therein one or more processors, memories, detectors, and/or other components and/or circuitry of the detection device 100 that facilitate operation of the detection device 100. As shown in FIG. 1, at least a portion of the user controls 110, display 115, and slot 120 are provided external to the housing 105 (e.g., on an external surface of the housing 105) to facilitate user interaction with the detection device 100. In various embodiments, additional components of the detection device 100 (e.g., further illustrated in FIG. 2) may be distributed at physical locations internal to and/or external to the housing 105.

The user controls 110 receive user input to operate the detection device 100. As shown in FIG. 1, the user controls 110 may be implemented as physical buttons on the housing 105 of the detection device 100. In some cases, the user controls 110 may be implemented by one or more keyboards, levers, joysticks, touchscreens, and/or other controls integrated with and/or coupled to the detection device 100. In some embodiments, the user controls 110 may be integrated with the display 115 as a touchscreen. The user controls 110 may be used by the user to set the detection device 100 in normal operation or a calibration operation. In some cases, the user may use the user controls 110 to provide inputs for defining a calibration operation.

The display 115 presents information to the user of the detection device 100. In various embodiments, the display 115 may be implemented as a liquid crystal display (LCD), an organic light emitting diode (OLED) display, and/or any other appropriate display. In an embodiment, the display 115 may display authorization requests (e.g., to perform calibration and/or additional measurements), measurement data, detection results (e.g., source identification information) derived at least in part from the measurement data, QR codes, and/or generally any feedback to the user that may, but need not, involve user interaction.

For example, the display 115 may indicate a status of a pending detection operation (e.g., amount of time elapsed and/or remaining), associated response data and/or expected data, potential errors (e.g., detector is not operating properly), and/or other information or prompts. The detection operation may be part of a calibration operation or normal operation. As another example, the display 115 may include an authorization request to initiate a detection operation. The user may respond to the authorization request and/or other prompts using the user controls 110.

In some embodiments, the detection device 100 may generate a QR code representation of the detection results. The QR code representation may include one or more QR codes. In some aspects, the detection results may be provided as a detection report, such as a summary report, a hot hit list, an error report, and/or generally any report derived based at least on the measurement data. For example, a summary report may include source identification information and associated metadata. A hot hit list may include source identification information associated with each listed substance that is detected for to indicate a presence or lack of presence of each substance.

In some embodiments, the detection report may be generally any report that indicates a determination (e.g., conclusion) of materials that were or were not detected, errors associated with detection and/or analysis operations during calibration or normal operation, and/or other information associated with the detection and/or analysis operations. In some cases, such as when the detection device 100 is unable to identify one or more materials in a sample of the external source, the detection report may indicate that further measurement data needs to be captured and/or further analysis (e.g., of existing measurement data or additional measurement data to be captured) needs to be performed, either by the detection device 100 and/or by other devices.

As shown in FIG. 1, a QR code representation encoding at least a portion of the detection results is displayed as a QR code 125 on the display 115 in accordance with an embodiment. In some cases, the detection device 100 may determine a number of QR codes to be generated to convey the detection results or portion(s) thereof and generate the determined number of QR codes. A computing device in proximity to the detection device 100 may optically scan the QR code 125 and extract (e.g., decode) the content contained therein for consumption by a user of the computing device. The computing device may be any device with appropriate QR code scanning and decoding capability for scanning and decoding the QR code 125.

Figure 2:
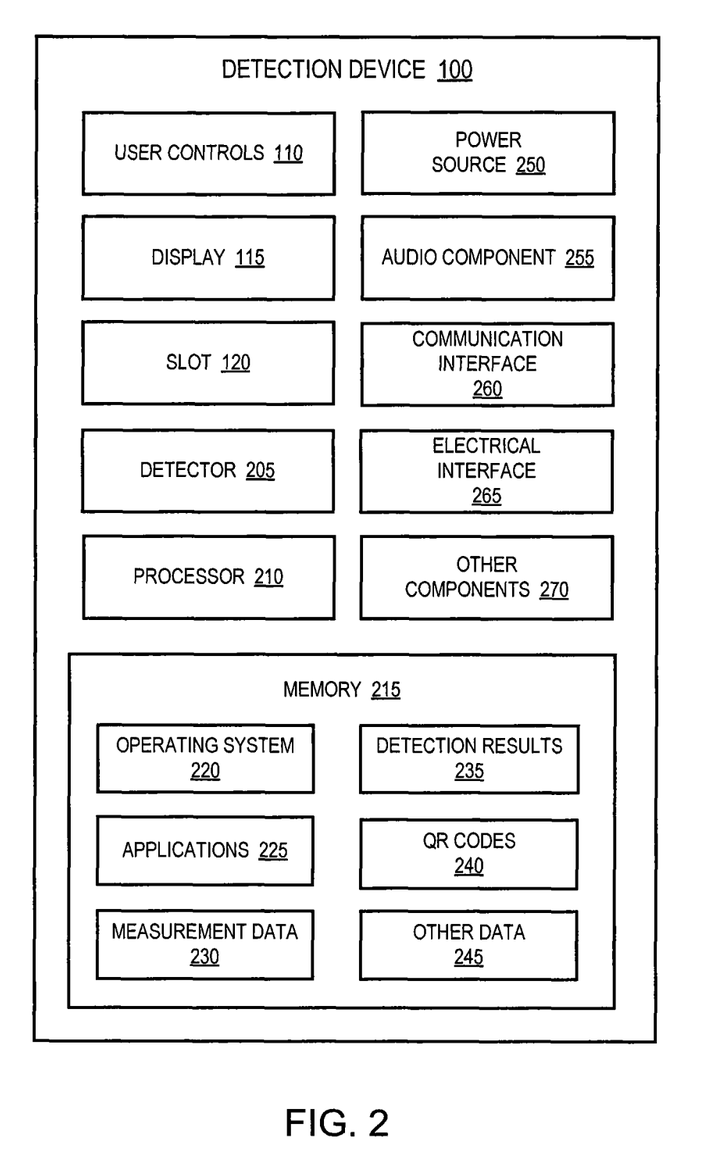
FIG. 2 illustrates a block diagram of the detection device of FIG. 1 in accordance with an embodiment of the disclosure.

FIG. 2 illustrates a block diagram of the detection device 100 in accordance with an embodiment of the disclosure. In addition to several previously discussed components shown in FIG. 1, the detection device 100 also includes a detector 205, a processor 210, a memory 215, a power source 250, an audio component 255, a communication interface 260, an electrical interface 265, and other components 270. The housing 105 of the detection device 100 may be presented as the outer box shown in FIG. 1. The various components within this outer box may be distributed at physical locations internal to and/or external to the housing 105. For example, at least a portion of the user controls 110 may be provided on an external surface of the housing 105 to facilitate interaction with a user of the detection device 100.

The detector 205 may capture measurement data 230 in response to an external source. In FIG. 2, the detector 205 is implemented as an analyte detector (e.g., biological detector and/or chemical detector). However, other types of detectors including ionizing radiation detectors, IR detectors, and/or thermal detectors may be used. For example, in the case of certain chemical detectors, the capturing of the measurement data 230 may include externally sampling an external source (e.g., a surface of interest) for analytes and providing the sample internally to the detector 205 (e.g., by inserting the sample into the slot 120) to allow the detector 205 to perform measurements on the analytes to obtain the measurement data 230. By way of non-limiting example, when a substance of interest is present, the response may include a fluorescent response, a luminescent response, a change in electrical properties (e.g., conductivity, resistivity, etc.), a colorimetric response (e.g., change in color), and/or other changes, relative to a case in which the substance of interest is not present.

The processor 210 may be implemented as one or more microprocessors, microcontrollers, system on a chip (SoC), application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of the detection device 100. In this regard, the processor 210 may execute machine readable instructions (e.g., software, firmware, or other instructions) stored in memory 215. For example, the processor 210 may generate control signals for the various components of the detection device 100 (e.g., display 115, detector 205). In an embodiment, the processor 210 may generate control signals to set the detection device 100 in normal operation or a calibration operation. In some cases, the processor 210 may be provided with autonomy to set the criterion or criteria to initiate a calibration operation and/or autonomy to define a calibration operation.

The processor 210 may receive the measurement data 230 captured by the detector 205 and analyze the measurement data 230 to determine detection results 235. The detector 205 may capture the measurement data 230 and provide at least a portion of the measurement data 230 to the processor 210. In some embodiments, the measurement data 230 may be captured by the detector 205 and/or provided to the processor 210 by the detector 205 on a periodic basis and/or upon request from the processor 210.

In some cases, the detection results 235 may include information that includes, for example, information identifying which materials of interest (e.g., biological and/or chemical matter) are determined to be present and/or which are determined not to be present in the external source. As another example, the detection results 235 may indicate that further analysis (e.g., by the detection device 100 and/or other devices) is needed to more conclusively identify a detected material, or that the external source includes material unknown to the detection device 100. In some embodiments, the detection results 235 may include metadata associated with the measurement data 230. In some cases, the detection results 235 may be generated as, or as part of, a detection report.

In some embodiments, to determine the detection results, the processor 210 may compare the measurement data and/or information derived therefrom with entries of a materials database containing information associated with various materials. For example, when the processor 210 receives the measurement data 230 from the detector 205 that is associated with interaction of an analyte (e.g., obtained as part of a sample of an external source) with the detector 205, the measurement data 230 may be compared with known responses of the detector 205 to chemical and/or biological material. In this manner, the material(s) that form the analyte may be identified.

For example, a known response may include a property change (e.g., resistivity change) of an analyte reporter of a chemical detector in response to various materials of interest. These known responses can be compared with a measured property change (e.g., measured change in resistivity) to identify materials of interest in the sample. The detection results may include an indication of the presence (or lack of presence) of material(s) of interest in the sample and, in some cases, an indication of a concentration of each material of interest captured in the sample.

In some embodiments, a calibration operation may be performed to evaluate performance characteristics (e.g., accuracy) of the detector 205. In a calibration operation, a sample whose contents are known (e.g., substances of interest contained on the sample are known) may be utilized to generate the detection results to evaluate performance characteristics of the detector 205.

In some cases, the detection results generated by the processor 210 may be in a form more amenable to analysis. In this regard, the detection results may include statistical information (e.g., averages, minimums, maximums, etc.) and/or profile information (e.g., in the form of a graph or histogram) to facilitate analysis of the measurement data 230 by the user of the detection device 100 and/or other users and/or facilitate comparison of the detection results 235 with expected results. In some cases, the detection results 235 may include textual and/or pictorial information.

In some embodiments, the processor 210 may generate a QR code representation including one or more QR codes (e.g., the QR code 125) that encode at least a portion of the detection results. In some cases, the measurement data and/or metadata associated with the detection report may also be encoded into the QR code(s). The QR code representation facilitates efficient communication (e.g., sharing) of the detection results 235. In some cases, the processor 210 may encrypt the detection results 235 (or portion thereof) and encode the encrypted report in one or more QR codes, such that devices with appropriate decryption material (e.g., decryption key) may decrypt the encrypted information.

In some cases, the processor 210 may determine a number of QR codes to provide the detection results 235 (or portion thereof) and any associated information based on a size (e.g., number of bytes) of the detection results 235 and associated metadata, and a capacity of each QR code. Each QR code may be part of a sequence of QR codes. In some cases, each QR code may have encoded therein an identifier to indicate an order (e.g., first, second, etc.) in which to decode or present the information encoded in the QR code to facilitate consumption of the encoded information. In some cases, some QR codes in the sequence are encrypted whereas other QR codes in the sequence are not encrypted. For example, a QR code having a summary report encoded therein may be unencrypted whereas a QR code having raw measurement data encoded therein may be encrypted, or vice versa.

The memory 215 may be implemented as a machine readable medium storing various machine readable instructions and data. For example, in some embodiments, the memory 215 may store an operating system 220 and one or more applications 225 as machine readable instructions that may be read and executed by the processor 210 to perform various operations described herein. The processor 210 may utilize the applications 225 to generate control signals to facilitate detection operation to obtain the measurement data 230, analyze the measurement data 230 to generate the detection results 235 (e.g., the detection report including source identification information), generate QR code representations including QR codes 240 of at least a portion of the detection results and associated information (e.g., measurement data 230, metadata), and/or other operations.

The memory 215 may store the measurement data 230, detection results 235, and QR codes 240 (and/or information to construct the QR codes 240). The memory 215 may store various types of data 245 including, for example, metadata associated with the measurement data 230 and/or detection results 235, profiles of various possible sources (e.g., materials of interest, energy radiation sources), and/or other information used or provided by the various components of the detection device 100.

In an embodiment, the memory 215 may store information pertaining to expected responses (e.g., expected response profiles) associated with different matter and/or energy of interest. For example, the information may include an expected response of certain analyte reporters when exposed to certain materials. In some cases, the processor 210 may perform comparisons between expected results (e.g., determined from equations/relations) and actual results (e.g., obtained from empirical response data) to generate the detection results 235 (e.g., the source identification information). In some cases, such information may be included in materials handbooks. For example, the memory 215 may store the materials handbooks themselves and/or may store information (e.g., links, access information, etc.) to access the materials handbooks (e.g., online or cloud sources).

In various embodiments, the memory 215 may be implemented to store such instructions and data in a non-transitory manner and/or may be implemented with both transitory and non-transitory portions to selectively store all or portions of such instructions and data in either manner as appropriate. In an embodiment, the memory 215 may be implemented as non-volatile memory (e.g., flash memory, hard drive, solid state drive, or other non-transitory machine readable mediums), volatile memory (e.g., random access memory), or combinations thereof.

The power source 250 may be used to provide power to the various components of the detection device 100. The power source 250 may be implemented, for example, as a battery to permit mobile and remote use of the detection device 100, a solar power source, a fuel cell, or wall power. In some embodiments, the power source 250 may be a removable battery. In some cases, the power source 250 may be coupled to an external power source and receive (e.g., be charged by) the external power source. The external power may be provided via a power cable connected to a wall socket and/or another device coupled to the power source 250. In one case, the power source 250 may be coupled to the external power source via the electrical interface 265.

The audio component 255 may be implemented, for example, as a speaker or other transducer with corresponding driver circuitry to provide audible sounds to a user of the detection device 100. For example, in some embodiments, the audio component 255 may provide audible signals in response to manipulation of the user controls 110 and/or in response to the operations of the processor 210. For example, the audio component 255 may emit an audible signal to indicate that a particular material is present or is not present, when analysis associated with sampling media is complete, that manual user input is required, and/or other audible alerts to indicate a status and/or result of detection operation to the user.

The communication interface 260 may be implemented as a wired and/or wireless interface connect the detection device 100 (e.g., by USB, Ethernet, WiFi, Bluetooth, cellular, infrared, radio, near field communication (NFC), and/or other protocols) with various external devices to update the operating system 220, update the applications 225, and/or communicate data (e.g., 230, 235, 240). The electrical interface 265 may connect to external power sources (e.g., a power outlet) to charge a battery of the power source 250 and/or to directly power the detection device 100. In some embodiments, the electrical interface 265 may be implemented by the communication interface 260. For example, the detection device 100 may be connected to another device via their respective USB interface using a USB cable. Such a USB connection may allow communication of data between the detection device 100 and the other device and/or provide power from the other device to the detection device 100 or vice versa.

Other components 270 may also be provided as appropriate for various types of the detection device 100 to support, for example, application specific operations of such devices. The components 270 may include additional components, circuitry, and/or logic for facilitating matter detection, identification, and information distribution. For example, in an analyte detection device, the components 270 may include one or more inlets, outlets, pumps, and/or heaters, and/or other components for providing analytes (e.g., in solid, liquid, or gaseous state) to the detector 205. Alternatively and/or in addition, the components 270 may include temperature sensors, speed sensors, location systems (e.g., global positioning systems), and/or other components. In this regard, the components 270 may be utilized to provide metadata associated with the detection results, such as the location, time, and/or weather conditions (e.g., temperature, rain, wind) associated with the capture of the measurement data 230.

It is noted that not all of the depicted components may be required, however, and one or more embodiments may include additional components not shown in FIG. 2. Variations in the arrangement and type of the components may be made without departing from the spirit or scope of the claims as set forth herein. Additional, fewer, and/or different components may be provided.

In some embodiments, the detection device 100 may be implemented without one or more of the various components discussed herein. For example, in some cases, the detection device 100 may be implemented without the display 115 and fixed or otherwise positioned at a designated location (e.g., in a permanently or semi-permanently manner), such as for surveillance purposes. In some cases, the designated location may not be readily accessible to a user of the detection device 100. Accordingly, in such embodiments, a user may interface with the detection device 100 (e.g., via the communication interface 260) using another user device (e.g., smartphone, laptop, etc.) to provide instructions to, obtain information (e.g., detection results and/or measurement data) from, and/or decrypt information from the detection device 100. In some cases, the user device may have hardware and/or software installed to facilitate such interfacing with the detection device 100. In this regard, for instance, the user device may provide a display for the detection device 100 and/or facilitate control of the detection device 100.

Although FIGS. 1 and 2 describe the example of the detector 205 implemented as an analyte detector that detects chemical and/or biological material based on analysis of captured samples (e.g., analytes), other detection devices may be implemented in accordance with embodiments discussed herein with appropriate adjustments made to the capture (e.g., sampling, measuring) of a sample and analysis thereof. For example, a detection device may be an ionizing radiation detection device, an IR detection device, and/or generally any detection device with one or more detectors for detecting matter and/or energy of interest.

In some embodiments, the detection device may be a radiation detection device with a detector (e.g., referred to as a radiation detector) that captures measurement data indicative of radiation present in an external source, such as a sample of material or a scene (e.g., ambient radiation). The radiation detector may measure energy, count, and/or count rate of radiation incident on (e.g., captured by) the radiation detector, which may be utilized to identify radioactive isotopes and/or determine dose rate. In some cases, the radiation detector may be responsive to one or more types of ionizing radiation present in incident radiation, such as alpha particles, beta particles, and/or gamma radiation.

For example, in some cases, the detection results may indicate the radioactive isotopes in the incident radiation and/or dose rate associated with the incident radiation. Alternatively or in addition, the detection results may include source identification information, such as a radiation profile (e.g., also referred to as radiation signature) of the radiation incident on the detector based at least in part on the measurement data, such as to facilitate identification of the radioactive isotopes present in the external source. For example, the radiation profile may be compared with reference radiation profiles for different types of radioactive isotopes (e.g., provided in materials handbooks) to determine the radioactive isotopes present in the incident radiation. In some cases, the radiation profile may be in the form of a histogram that places counts of ionizing radiation into one of many bins, where each is associated with an energy range.

As an example, Table 1 provides an example of types of information that may be provided by a radiation detection device in a detection report. The detection report may be encoded in one or more QR codes.

TABLE 1

| | |
|---|---|
| Server Information | Generation Date |
| Device Information | Operator Name |
| | Operator Callback Number |
| | Instrument Model, ID, and Manufacturer |
| Device Version(s) | Version Number |
| Results | Dose Rate Statistics (maximum, minimum, average) |
| | Threat Level |
| | Detected Radioisotopes |
| | Spectrum Information |
| | Nuclide Information |

The detection report of Table 1 includes detection results obtained by analyzing measurement data. As shown in Table 1, the detection report includes results (e.g., dose rate statistics, threat level, detected radioisotopes, spectrum information, and nuclide information) generated based on an analysis of the measurement data as well as metadata. The results may include an identification of radioisotopes determined to have been detected and/or a profile (e.g., provided as spectrum information) for facilitating identification of radioisotopes and/or verification of identified radioisotopes. In some cases, the detection report may include pictorial information, such as a histogram, to facilitate source identification.

In some embodiments, the detection device may be an IR detection device with a detector (e.g., referred to as an infrared detector) that captures measurement data indicative of IR radiation present in an external source (e.g., infrared radiation associated with a scene). In this regard, the detector may capture a scene encompassed by its field of view and represent the captured scene as IR images. The detector may detect objects (e.g., intruders, harmful objects) in IR images (e.g., using object recognition technology) and classify these objects. For example, each object may have an associated IR profile (e.g., also referred to as an IR signature), which may depend on factors such as a size and shape of the object, temperature, emissivity, and/or other factors. The detection results may include an indication of the objects of interest determined to be in the scene, and/or associated infrared profiles to facilitate analysis of the scene and/or objects therein by other devices.

Figure 3:
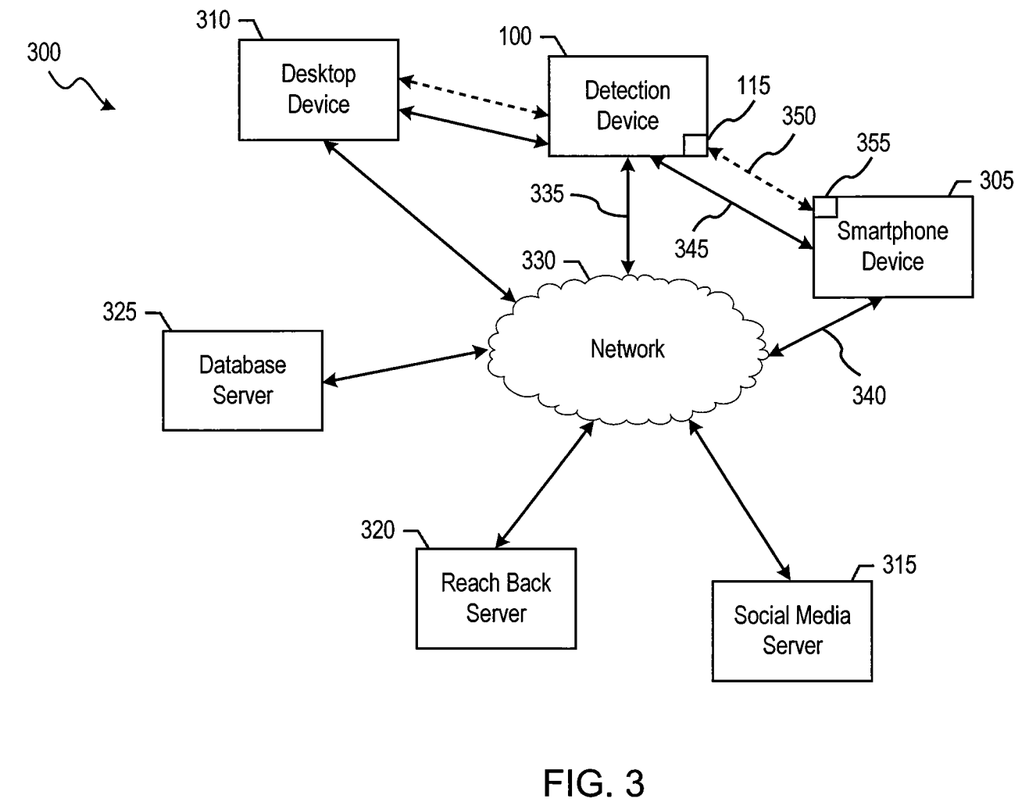
FIG. 3 illustrates an example network environment in which communication of detection results may be implemented in accordance with an embodiment of the present disclosure.

FIG. 3 illustrates an example network environment 300 in which communication of detection results may be implemented in accordance with an embodiment of the present disclosure. The network environment 300 includes various devices connected over a network 330. Such devices include, for example, the detection device 100, a smartphone device 305, a desktop device 310, a social media server 315, a reach back server 320, and a database server 325, all collectively referred to as devices/servers 305-325.

The detection device 100 and devices/servers 305-325 are capable of communicating with each other and/or with one or more other devices/servers via wireless and/or wired communication. In some cases, one or more of the social media server 315, reach back server 320, database server 325 may be, or may be part of, a server farm.

The smartphone device 305 and desktop device 310 may be utilized to receive and decode one or more QR codes generated by the detection device 100. In some cases, to receive the QR code(s), the smartphone device 305 and/or desktop device 310 optically scan the QR code(s) from the display 115 of the detection device 100 and/or through a wired or wireless connection with the detection device 100. In other cases, when the QR code(s) are loaded onto servers 315, 320, and/or 325, the smartphone device 305 and/or desktop device 310 may access the QR code(s) from the servers 315, 320, and/or 325.

The social media server 315, reach back server 320, and database server 325 may each facilitate distribution of QR codes that encode detection results therein. The social media server 315 may support a social media network onto which QR codes can be uploaded and shared with other users of the social media network. The reach back server 320 may support a reach back network onto which QR codes can be uploaded and shared, with reach back personnel being able to facilitate source matter and/or source energy identification (e.g., harmful substances, harmful radiation levels) and mitigation in response to such detection. The database server 325 may provide a repository for QR codes and generally any information that facilitates source identification and mitigation in response to such identification.

The detection device 100 and devices/servers 305-325 may communicate using one or more wireless communication technologies, such as Wi-Fi (IEEE 802.11ac, 802.11ad, etc.), cellular (3G, 4G, 5G, etc.), Bluetooth™, NFC, etc., and/or one or more wired communication technologies (e.g., direct device-to-device USB connection, wired network connection). The network 330 may include a local area network (LAN), a wide area network (WAN), an Intranet, or a network of networks (e.g., the Internet). In some cases, one or more of the detection device 100 and/or devices/servers 305-325 may be in direct communication (e.g., non-networked communication) with each other (e.g., without any intervening devices). For example, the detection devices may communicate via near field communication, Bluetooth communication, optical communication, and/or USB communication.

In FIG. 3, the detection device 100 may communicate with the devices/servers 305-325 via the network 330 (e.g., a wireless and/or wired network). For instance, the detection device 100 and smartphone device 305 may be connected to the network 330 via a connection 335 and 340, respectively. In some cases, the detection device 100 may be in physical proximity to the smartphone device 305, such that the detection device 100 may be in direct communication (e.g., non-networked communication) with the smartphone device 305. The direct communication may be provided via a direct connection 345 between the detection device 100 and the smartphone device 305. The direct connection 345 may include a wireless connection, such as a Bluetooth™ and/or NFC connection, and/or a wired connection, such as a USB connection. The direct communication may also be provided via a line-of-sight optical path 350. The line-of-sight optical communication may be between the display 115 of the detection device 100 and an imager 355 (e.g., a camera) of the smartphone device 305. For example, the detection device 100 may display a QR code on the display 115 and the imager 355 of the smartphone device 305 may be utilized to scan the QR code displayed on the display 115. In this example, the detection device 100 and/or the smartphone device 305 may select the option by which the QR code is to be provided by the detection device 100 to the smartphone device 305 (e.g., via the network 330, the direct connection 345, and/or optical path 350).

In some embodiments, the network environment 300 facilitates distribution of (e.g., sharing of) the QR code(s) by the detection device 100 to other devices and/or servers. In some cases, the detection device 100 may distribute the QR code(s) (e.g., some or all QR codes) in a secure manner, such as by encrypting the detection results and encoding the detection results in the QR code(s).

In some cases, the detection device 100 may have no network connectivity and no devices in proximity. In such cases, the detection device 100 may store the QR code representation until such time that the detection device 100 is able to distribute the QR code representation, such as when the detection device 100 has network connectivity and/or is able to have the QR code representation optically scanned by another device.

The distribution of the QR code(s) may allow other users (e.g., colleagues of the user of the detection device 100, third parties, and/or other relevant or interested parties) to be informed of the detection results. In some cases, these other users may analyze the detection results (e.g., verify the source identification information) and/or perform actions (when needed or requested) in response to the detection results, such as further distribute the detection results or perform mitigation actions in response to the detection results. In this regard, in some cases, the detection results are and/or are derivable into user-actionable information (e.g., also referred to as user-actionable intelligence) which one or more recipients of the detection results may analyze, determine appropriate actions, and perform or cause to be performed the actions.

For example, these other users may be, or may contact, appropriate first responders capable of mitigating the harmful substance. Information indicative of the location and time associated with the detection results may be provided in the same QR code or a second QR code (e.g., a QR code provided in temporal proximity before or after the QR code containing the indication of the harmful substance's presence).

As another example, when the detection results indicate that the detection device 100 is unable to conclusively identify a substance or is able to conclusively determine that a substance is unknown to the detection device 100, the detection device 100 may implicitly or explicitly request assistance to identify the substance and/or mitigate presence of the substance.

In some embodiments, the network environment 300 facilitates feedback in response to detection results provided by the detection device 100. The devices/servers 305-325 may perform analysis of the detection results and request further information from the detection device 100. For example, the devices/servers 305-325 may request that the detection device 100 provide the measurement data used to generate the detection results (e.g., if none or only a portion of the measurement data has been provided by the detection device 100). The detection device 100 may then provide the measurement data (e.g., as part of a new QR code). In some cases, such as when the detection device 100 generates incorrect and/or incomplete detection results, feedback regarding the source identification information may be provided via the social area network and/or reach back network to request that corrective action be performed on the detection device 100. Such feedback may be utilized to facilitate subsequent source detection and/or identification by the detection device 100.

In one embodiment, the social media server 315 may facilitate distribution of the QR code(s) encoding detection results and associated information. The social media server 315 may support a social media network onto which textual data and/or image data can be uploaded and shared (e.g., in accordance with policies and security/privacy settings set by the user uploading the data and the social media network). In general, the social media network may be readily accessible by users with accounts for the social media network. For example, the detection device 100, smartphone device 305, desktop device 310, reach back server, database server 325, and/or devices and/or servers may log into the social media network to upload data and/or access (e.g., download, decrypt) data uploaded onto the social media network (e.g., with appropriate access/security credentials set by the content uploader and/or social media network).

In some cases, the user of the detection device 100 may provide the QR code representation to the social media server 315 to allow the QR code representation to be uploaded to a social media network by the social media server 315, thus facilitating distribution. In some cases, the social media network may be an image-oriented social media network onto which users can readily upload image data. The QR code representation may be stored as part of an image file having an image file format compatible with the social media network to allow uploading of the image file onto the social media network (e.g., via the user's account associated with the social media network). For example, the image file may have one or more QR codes.

As an example, the user of the detection device 100 may generate the image file and upload the image file to the user's social media account using the detection device 100. As another example, the user of the detection device 100 may transmit (e.g., optically transmit, wirelessly transmit) the QR code representation (e.g., one or more QR codes) to the smartphone device 305, and then upload the image file containing the QR code representation using the smartphone device 305. In this latter example, the user may not have access to, or may simply not prefer to access, the social media network using the detection device 100 and/or may not have an appropriate image file generating application installed on the detection device 100 to generate the image file containing the QR code representation. The devices/servers 305-325 may be utilized by a different user(s) to access the social media network to obtain the image containing the QR code representation.

In one embodiment, the social media server 320 may facilitate distribution of the QR code(s) encoding detection results and associated information. The reach back server 320 may support a reach back network for facilitating source matter and/or source energy identification (e.g., harmful substances, harmful radiation levels) and facilitating mitigation in response to such detection. In some cases, the reach back server 320 may analyze the detection results, measurement data, and/or any data associated with dangerous, potentially dangerous, and/or unknown matter. The reach back server 320 may be supported by one or more government authorities, national laboratories, and/or other authorities and/or organizations with personnel capable of analyzing received data (e.g., detection results, measurement data) and/or performing actions in response to the received data.

The reach back server 320 may receive QR codes that contain detection results and associated metadata (e.g., indicating location and time associated with the source identification information and/or measurement data) In some cases, the QR codes may include an indication or a request that further analysis of the detection results be performed by personnel associated with the reach back network, such as when the detection device (e.g., 100) that generated the detection results is unable to conclusively determine presence of a material of interest, determines that a suspicious detected material is unknown to the detection device, or otherwise requests confirmation or correction of the source identification information. In some cases, the reach back network may include, or may have direct contact with, first responders capable of analyzing and/or mitigating any suspicious substance.

In one embodiment, the database server 325 may store information that facilitates source identification and mitigation in response to such identification. For example, the database server 325 may store information from materials handbooks, which may be accessed, downloaded, and/or distributed by the other devices/servers (e.g., 100, 305, 310, 315, 320). The information may include material properties (e.g., composition, phase change temperatures, etc.) and expected responses of a material in response to stimuli (e.g., incident particles, incident radiation, etc.). The information may include how to neutralize dangerous substances. Such information stored by the database server 325 may be updated on a regular basis to correct, update, or add information, such as in response to new empirical data and/or simulation data (e.g., provided by the detection device 100, social media server 315, reach back server 320, and/or other devices/servers).

In some cases, the database server 325 may store the detection results generated by detection devices (e.g., the detection device 100). The detection results may be stored using their QR code representation. For instance, the database server 325 may support a website that provides a repository for QR codes with detection reports (e.g., containing source identification information) encoded therein and displays such QR codes. Metadata, such as timestamps, location, weather conditions, may be encoded in the QR code representation and/or provided alongside the QR code representation (e.g., to allow a user to see the metadata associated with the QR code representation before optically scanning the QR code representation).

Although the network environment 300 shows an example combination of devices/servers and connections therebetween (e.g., wired connection, wireless connection, network-based connection, non-network-based connection, etc.), a network environment may include a different number/type of devices and/or servers and/or a different number/type of connections therebetween. For example, although FIG. 3 shows direct communication (e.g., non-network-based communication) between the detection device 100 and the smartphone device 305, the detection device 100 may have similar direct communication connections with one or more of the desktop device 310, social media server 315, reach back server 320, and/or database server 325.

Figure 4:
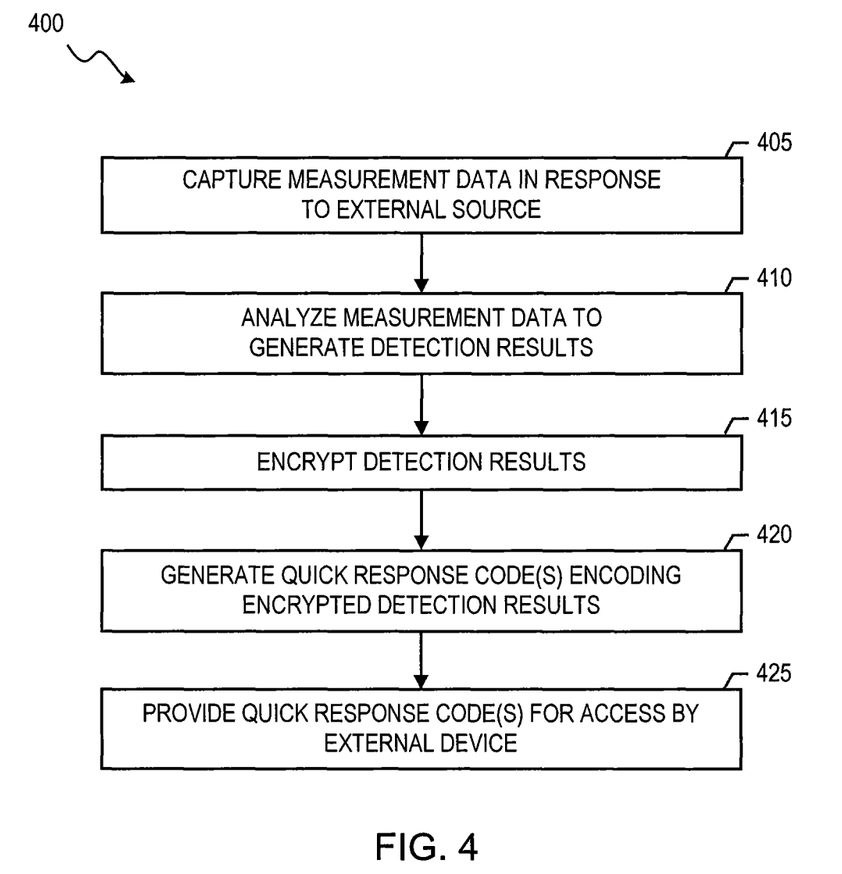
FIG. 4 illustrates a process of operating a detection device in accordance with an embodiment of the disclosure.

FIG. 4 illustrates a process 400 of operating the detection device 100 in accordance with an embodiment of the disclosure. Although the process 400 is described with reference to the detection device 100, the process 400 is not limited to the detection device 100.

At block 405, the detection device 100 captures measurement data (e.g., using the detector 205) in response to an external source (e.g., any source of stimulation for the detection device 100). At block 410, the detection device 100 analyzes (e.g., using the processor 210) the measurement data to generate detection results. The detection results may indicate and/or facilitate identification of biological and/or chemical substances, ionizing radiation (e.g., alpha particles, gamma rays), and/or other matter and/or energy that the detection device 100 is suitable for detecting in the external source.

The detection results may be, or may be included as part of, a detection report (e.g., summary report, error report, hot hit list). In some cases, the detection results may include metadata associated with the measurement data and/or source identification information. The detection results may include pictorial information, such as histogram information generated based on analyzing the measurement data.

In some embodiments, to determine the detection results, the detection device 100 may generate measured characteristics (e.g., radiation profile information) based on the measurement data, retrieve reference characteristics (e.g., expected radiation profile information stored in the memory 215), compare the measured characteristics with the reference characteristics, and determine the detection results based on the comparison.

At block 415, the detection device 100 encrypts at least a portion of the detection results to obtain encrypted detection results. At block 420, the detection device 100 generates a QR code encoding the encrypted detection results. Such encryption may be performed to facilitate secure communication of the QR code.

In some embodiments, the encryption of the detection results is optional. For example, in some cases, the detection device 100 does not encrypt any portion of the detection results, such that the QR code generated at step 420 encodes non-encrypted detection results.

In some cases, the detection device 100 may generate multiple QR codes of the detection results, where each QR code may include a respective portion of the detection results. For example, the detection device 100 may determine a number of QR codes to provide the detection results and generate the determined number of QR codes. In some cases, QR codes associated with different capacities may be utilized to encode the portions of the detection results. In some cases, some portions of the detection results may be encrypted whereas other portions of the detection results are not encrypted prior to use in generating one or more QR codes.

At block 425, the detection device 100 provides the QR code(s) for access by other devices (e.g., intended recipient devices). As an example, the detection device 100 may provide the QR code(s) by displaying the QR code(s) on the display 115 of the detection device 100. An imager of a device in proximity to the detection device 100 may optically scan the QR code directly from the display 115. As another example, the detection device 100 may transmit (e.g., wirelessly or wired) the QR code(s) over a network (e.g., the network 330) and/or over a non-network-based connection (e.g., the connection 345) to one or more other devices (e.g., 305, 310) and/or servers (e.g., 315, 320, 325).

In some cases, the detection device 100 may provide a decoding sequence associated with the QR codes. One or more QR codes may include an indication of an order in which the detection device 100 is to decode the QR code representation. In one case, each QR code may include an identifier indicating a sequence number. For example, a QR code with a sequence number of 1, 2, 3, etc. may be intended to be decoded first, second, third, etc., respectively. In some cases, the decoding sequence may provide a preferred (e.g., not required) order, such as to facilitate consumption of the detection report. In other cases, the decoding sequence may be required. All, some, or none of the QR codes in the sequence may be encrypted.

Figure 5:
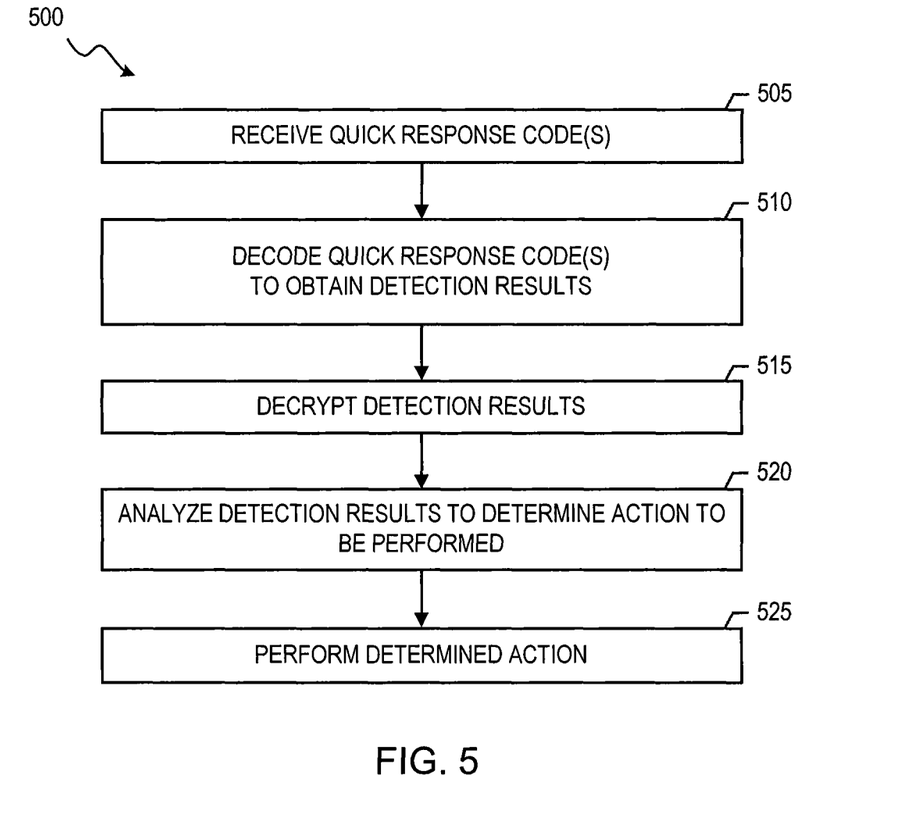
FIG. 5 illustrates a process of processing a QR code in accordance with an embodiment of the disclosure.

FIG. 5 illustrates a process 500 of processing a received QR code representation in accordance with an embodiment of the disclosure. Although the process 500 is described with reference to the reach back server 320 of the network environment 300 of FIG. 3, the process 500 is not limited to the reach back server 320 of the network environment 300 of FIG. 3. For example, the process 500 may be performed by any one of the other devices or servers among the devices/servers 305-325, and/or by devices or servers not provided in the network environment 300.

At block 505, the reach back server 320 receives the QR code(s) that encode the detection results. For example, the detection device 100 may upload the QR code(s) to the reach back server 320, or other network server (e.g., the social media server 315, cloud-based server) to allow access/retrieval of the QR code(s) from an associated network (e.g., social media network) by the reach back server 320.

At block 510, the reach back server 320 (e.g., a processor of the reach back server 320) decodes the QR code(s) to obtain the detection results. For example, the QR code(s) may be displayed by the reach back server 320 and optically scanned to allow decoding, or decoded without needing to display and optically scan. In cases that the QR code(s) includes encrypted data, the reach back server 320 may perform decryption. After decoding the QR code(s) (or a subset thereof), the reach back server 320 may analyze the detection results, display the detection results (e.g., for examination by an operator), and/or otherwise process the detection results.

At block 515, the reach back server 320 decrypts the detection results obtained from the reach back server 320 when the detection results are encrypted as previously discussed with regard to block 415 of FIG. 4. In some cases, specific hardware engines (e.g., hardware cryptographic engines) and/or specific software processes that correspond to encryption-side hardware and/or software are used to decrypt encrypted detection results. Block 515 is optional when the detection results are not encrypted. At block 520, the reach back server 320 (e.g., a processor of the reach back server 320) analyzes the detection results to determine one or more actions to be performed. In some cases, the detection results may be, or may be derived into, user-actionable information.

At block 525, the reach back server 320 (e.g., a processor of the reach back server 320) performs the determined action(s). By way of non-limiting example, the action(s) may include the reach back server 320 saving the detection results, verifying the detection results, mitigation action in response to the detection results (e.g., the source identification information indicates a dangerous substance has been detected by the detection device 100 at a certain location), further distributing the detection results or portion thereof (e.g., provide to the social media server 315), and/or other actions. In some cases, the reach back server 320 may contact appropriate authority (e.g., an appropriate first responder) to cause mitigation actions to be performed by the appropriate authority.

In some cases, the reach back server 320 may provide feedback to the detection device 100, such as to request further information from the detection device 100, indicate that the source identification information (e.g., and/or other portion of the detection report) is determined to be accurate or inaccurate, and/or other feedback. For example, the reach back server 320 may request that the detection device 100 transmit the measurement data (e.g., encoded in one or more QR codes or provided in another format) to the reach back server 320.

In view of the present disclosure, it will be appreciated that various embodiments provided herein can be used for facilitating detection results communication for detection devices. In this regard, generation of QR codes encoding detection results may allow the source detection results to be more readily distributed to intended recipients, since QR codes generally take up little real estate when displayed on a screen or printed out on paper or other material. In some cases, such distribution may be to and/or by way of a reach back network or a social media network, which may provide dynamic platforms suited for uploading, downloading, or otherwise communicating QR codes between different devices and/or servers.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

A reference to an element in the singular is not intended to mean one and only one unless specifically so stated, but rather one or more. For example, "a" detector may refer to one or more detectors. An element preceded by "a," "an," or "the" does not, without further constraints, preclude the existence of additional same elements.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
    capturing measurement data at an analyte detector of a device in response to an external source;
    retrieving from a materials database, by a processor of the device, reference information associated with one or more chemical materials;
    comparing, by the processor, the measurement data to the reference information to determine whether the external source comprises any of the chemical materials;
    generating, by the processor, detection results based on the comparison, the detection results indicating which of the chemical materials are present in the external source;
    generating, by the processor, a quick response (QR) code encoding at least a portion of the detection results; and
    providing the QR code for access by an external device, wherein the external device is coupled to a network server supporting a network for distributing the QR code to other users of the network to determine at least one of an identification of the external source or a mitigation action based on an analysis of the detection results.

2. The method of claim 1, wherein the providing comprises at least one of:
    displaying the QR code on a display of the device to facilitate optical scanning of the QR code by the external device; or
    transmitting the QR code to the external device through a line-of-sight optical communication path.

3. The method of claim 1, wherein the network server comprises at least one of:
    a social media network server or a reach back network server supporting a network onto which the QR code can be uploaded and shared to facilitate the determining the at least one of the identification of the external source or the mitigation action; or
    a database server providing a repository for QR codes and information facilitating source identification and mitigation in response to the source identification.

4. The method of claim 1, wherein the reference information identifies expected measurement data.

5. The method of claim 1, wherein the generating the QR code comprises:
    encrypting the detection results encoded by the QR code.

6. The method of claim 1, wherein:
    the generating the QR code comprises generating a plurality of QR codes collectively encoding the detection results; and
    the providing comprises providing the QR codes for access by the external device.

7. The method of claim 1, wherein the detection results comprise at least one of:
    pictorial information and/or metadata associated with the capturing of the measurement data; or
    a profile associated with the external source.

8. The method of claim 1, wherein the chemical materials comprise at least one of an explosive, a narcotic, a chemical warfare agent, a toxic industrial chemical (TICs), and/or an illicit substance.

9. The method of claim 1, wherein the generating the QR code comprises:
    encrypting the detection results encoded by the QR code.

10. The method of claim 1, further comprising receiving, by the device, a feedback from the network server based on an analysis of the detection results.

11. A device comprising:
    an analyte detector configured to capture measurement data in response to an external source;
    one or more processors; and
    one or more memories comprising instructions stored therein, which when executed by the one or more processors, cause the one or more processors to perform operations comprising:
        retrieving from a materials database, reference information associated with one or more chemical materials;
        comparing the measurement data to the reference information to determine whether the external source comprises any of the chemical materials;
        generating detection results based on the comparison, the detection results indicating which of the chemical materials are present in the external source;
        generating a quick response (QR) code encoding at least a portion of the detection results; and
        providing the QR code for access by an external device, wherein the external device is coupled to a network server supporting a network for distributing the QR code to other users of the network to determine at least one of an identification of the external source or a mitigation action based on an analysis of the detection results.

12. The device of claim 11, wherein the providing comprises at least one of:
    displaying the QR code on a display of the device to facilitate optical scanning of the QR code by the external device; or
    transmitting the QR code to the external device through a line-of-sight optical communication path.

13. The device of claim 11, wherein the network server comprises at least one of:
    a social media network server or a reach back network server supporting a network onto which the QR code can be uploaded and shared to facilitate the determining the at least one of the identification of the external source or the mitigation action; or
    a database server providing a repository for QR codes and information facilitating source identification and mitigation in response to the source identification.

14. The device of claim 11, wherein the reference information identifies expected measurement data.

15. The device of claim 11, wherein:
    the generating the QR code comprises generating a plurality of QR codes collectively encoding the detection results; and
    the providing comprises providing the QR codes for access by the external device.

16. The device of claim 11, wherein the detection results comprise pictorial information and/or metadata associated with the capturing of the measurement data.

17. The device of claim 11, wherein the detection results comprise a profile associated with the external source.

18. The device of claim 11, wherein the chemical materials comprise at least one of an explosive, a narcotic, a chemical warfare agent, a toxic industrial chemical (TICs), and/or an illicit substance.

19. A method comprising:
- capturing measurement data at a radiation detector of a device in response to an external source;
- retrieving from a materials database, by a processor of the device, reference information associated with one or more radioactive materials;
- comparing, by the processor, the measurement data to the reference information to determine whether the external source comprises any of the radioactive materials;
- generating, by the processor, detection results based on the comparison, the detection results indicating which of the radioactive materials are present in the external source;
- generating, by the processor, a quick response (QR) code encoding at least a portion of the detection results; and
- providing the QR code for access by an external device, wherein the external device is coupled to a network server supporting a network for distributing the QR code to other users of the network to determine at least one of an identification of the external source or a mitigation action based on an analysis of the detection results.

20. The method of claim 19, wherein the radioactive materials comprise a radioactive isotope that emits at least one of alpha particles, beta particles, and/or gamma radiation.

* * * * *